United States Patent
Kim et al.

(10) Patent No.: US 9,477,593 B2
(45) Date of Patent: Oct. 25, 2016

(54) SEMICONDUCTOR DEVICE AND OPERATING METHOD THEREOF

(71) Applicant: SK hynix Inc., Icheon-si Gyeonggi-do (KR)

(72) Inventors: Dong-Gun Kim, Hwaseong-si (KR); Yong-Kee Kwon, Icheon-si (KR); Hong-Sik Kim, Seongnam-si (KR)

(73) Assignee: SK HYNIX INC., Icheon-Si (KR)

( * ) Notice: Subject to any disclaimer, the term of this patent is extended or adjusted under 35 U.S.C. 154(b) by 85 days.

(21) Appl. No.: 14/504,746

(22) Filed: Oct. 2, 2014

(65) Prior Publication Data

US 2015/0106551 A1    Apr. 16, 2015

(30) Foreign Application Priority Data

Oct. 14, 2013 (KR) .................... 10-2013-0121724

(51) Int. Cl.
*G06F 12/02* (2006.01)

(52) U.S. Cl.
CPC ... *G06F 12/0246* (2013.01); *G06F 2212/7211* (2013.01)

(58) Field of Classification Search
CPC ............. G06F 3/0679; G06F 11/1068; G06F 2212/2022; G06F 2212/72; G06F 2212/7211; G06F 2212/7201; G06F 2212/7206; G06F 2212/7207; G06F 2212/7208; G06F 12/0246
See application file for complete search history.

(56) References Cited

U.S. PATENT DOCUMENTS

| | | | | |
|---|---|---|---|---|
| 7,477,740 B2* | 1/2009 | Bennett | ............... | G06F 12/1408 380/210 |
| 2012/0324141 A1* | 12/2012 | Seong | ................. | G06F 12/0238 711/3 |
| 2013/0013886 A1 | 1/2013 | Franceschini et al. | | |
| 2013/0254514 A1* | 9/2013 | Yu | ....................... | G06F 12/0246 711/209 |

OTHER PUBLICATIONS

Nak Hee Seong, et al. Security Refresh: Prevent Malicious Wear-out and Increase Durability for Phase-Change Memory with Dynamically Randomized Address Mapping, ISCA 2010, N.H. Atlanta, USA.

Joosung Yoon, et al. Bloom Filter-based Dynamic Wear Leveling for Phase-Change RAM, 2012.

* cited by examiner

*Primary Examiner* — David X Yi
*Assistant Examiner* — Tahilba Puche
(74) *Attorney, Agent, or Firm* — William Park & Associates Ltd.

(57) ABSTRACT

A semiconductor device remaps the relationship between logical addresses and physical addresses of a semiconductor memory device at each first interval. The semiconductor device may include a wear leveling controller configured to select a first physical address of the semiconductor memory device to remap a logical address corresponding to the first physical address of the semiconductor memory device to a second physical address of the semiconductor memory device, and to adjust the first interval.

19 Claims, 10 Drawing Sheets

FIG. 3

| Mapped Address | Count |
|---|---|
| 000 | 1 |
| 010 | 8 |
| 011 | 10 |
|  |  |
|  |  |

| Logical Address | Physical Address | Refreshed ? |
|---|---|---|
| 000 | 000 | 0 |
| 001 | 001 | 0 |
| 010 | 010 | 0 |
| 111 | 111 | 0 |

| Number of Hits | 0 |
|---|---|
| Number of Misses | 0 |

160

SEMICONDUCTOR DEVICE AND OPERATING METHOD THEREOF

CROSS-REFERENCE TO RELATED APPLICATIONS

The present application claims priority of Korean Patent Application No. 10-2013-0121724, filed on Oct. 14, 2013, which is incorporated herein by reference in its entirety.

BACKGROUND

1. Field

Embodiments relate to a semiconductor device and an operating method thereof, and more particularly, to a semiconductor device configured to control a wear leveling operation of a semiconductor memory device, and an operating method thereof.

2. Description of the Related Art

Typically a limited number of write operations can be performed on cell of a semiconductor memory device, such as for example a NAND flash memory device or a phase change memory device prior to the degradation of that cell. For example, the number of write requests that may be performed in a cell in a phase change memory device may range from $10^6$ to $10^8$ write operations.

When write operations are concentrated in a specific cell region, the lifespan of the entire memory device may be shortened. A wear leveling operation is often performed in an attempt to uniformly distribute write operations across the cell regions of the semiconductor memory device.

When a write request is performed, a logical address received from a host is mapped to a physical address, and the write request is performed on the mapped physical address. The mapping operation between the logical address and the physical address may be performed in a number of different ways. For example, the physical address may be generated by performing an operation on the logical address and key data, during the mapping operation.

SUMMARY

In an embodiment, a semiconductor device that remaps the relationship between logical addresses and physical addresses of a semiconductor memory device at each first interval may include a wear leveling controller configured to select a first physical address of the semiconductor memory device to remap a logical address corresponding to the first physical address of the semiconductor memory device to a second physical address of the semiconductor memory device, and to adjust the first interval.

In an embodiment, a semiconductor device that remaps the relationship between physical addresses and logical addresses of a semiconductor memory device at each first interval may include a hot/cold determiner configured to define an attribute of at least one physical address of the semiconductor memory device corresponding to a write address into one of a hot attribute and a cold attribute; a register configured to store the at least one physical address of the semiconductor memory device if the at least one physical address is determined to be hot; and a wear leveling controller configured to select the hottest physical address from among the at least one physical address stored in the register as a candidate physical address at each first interval, remap the relationship between the candidate physical address and a logical address by selecting one of physical addresses that have not been remapped, as the candidate physical address when the candidate physical address has already been remapped, and to adjust the first interval based on a determination of whether the candidate physical address has been remapped.

In an embodiment, an operating method of a semiconductor device may include comparing a first interval to a number of write requests during a write request, and determining whether to perform a remapping operation, selecting a first physical address of the semiconductor memory device to remap, remapping a first logical address corresponding to the first physical address to a second physical address of the semiconductor memory device, issuing a command to the semiconductor memory device to swap data of the first physical address for data of the second physical address; and adjusting the first interval.

In an embodiment, a system may include a semiconductor memory device and a controller configured to sequentially remap the relationship between logical addresses and physical addresses of the semiconductor memory device at each first interval. The controller may include a wear leveling controller configured to select a first physical address of the semiconductor memory device to remap a logical address corresponding to the first physical address to a second physical address of the semiconductor memory device, and to adjust the first interval.

BRIEF DESCRIPTION OF THE DRAWINGS

FIG. 3 is a block diagram representation of a danger address register of FIG. 2;

FIG. 4 is a block diagram representation of a status register of FIG. 2;

DETAILED DESCRIPTION

Figure 1:
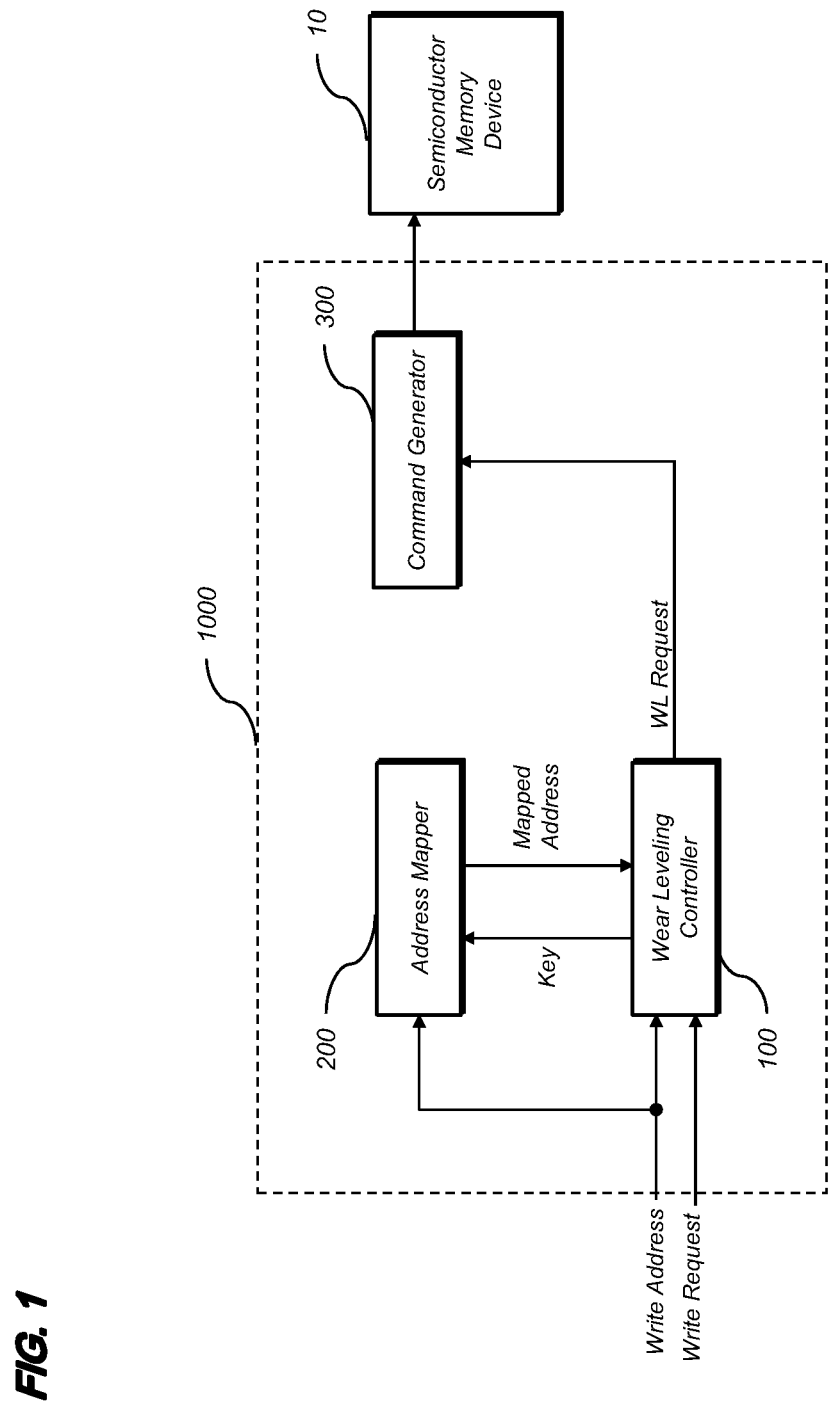
FIG. 1 is a block diagram representation of a system including an embodiment of a semiconductor device.

Various embodiments will be described below in more detail with reference to the accompanying drawings. Throughout the disclosure, like reference numerals refer to like parts throughout the various figures and embodiments.

FIG. 1 is a block diagram representation of a system including an embodiment of a semiconductor device 1000.

The semiconductor device 1000 performs a wear leveling operation on the semiconductor memory device 10. Examples of the semiconductor memory device 10 may include a NAND flash memory device and a phase change memory device, but is not limited thereto.

An embodiment of the semiconductor device 1000 may include a wear leveling controller 100, an address mapper 200, and a command generator 300.

The wear leveling controller 100 generates a write leveling request based on a write request and a write address. The write address may also be referred to as a logical address. The wear leveling controller 100 generates a mapped address corresponding to a physical address. The wear leveling controller 100 provides the generated write leveling request to the command generator 300.

The address mapper 200 receives a key and the write address as inputs and generates a mapped address as a physical address. The write address is a logical address received from the host. The address mapper 200 may, for example, perform an XOR operation on the write address and the key and output the mapped address.

The wear leveling controller 100 may, for example, select a first physical address to refresh and a second physical address. The second physical address is swapped for the first physical address. The first and second physical addresses are refreshed together through the swap operation.

The wear leveling controller 100 may temporarily store data read from the first physical address, and may store data read from the second physical address into the first physical address. The wear leveling controller 100 may transmit a request for storing the data that is temporarily stored in the second physical address to the command generator 300.

The command generator 300 may transmit a read command or a write command to the nonvolatile memory device 10 based on the request received from the wear leveling controller 100.

In an embodiment, the wear leveling controller 100 does not perform a refresh operation in order of address size. The wear leveling controller 100, for example, performs a refresh operation on the address that receives a relatively high number of write requests.

In an embodiment, the wear leveling controller 100 does not perform wear leveling following a predetermined number of write operations, but adaptively adjusts the interval at which the wear leveling is performed based on a number of different elements, such as for example, the history of a write request.

The wear leveling method will be described below in more detail.

Figure 2:
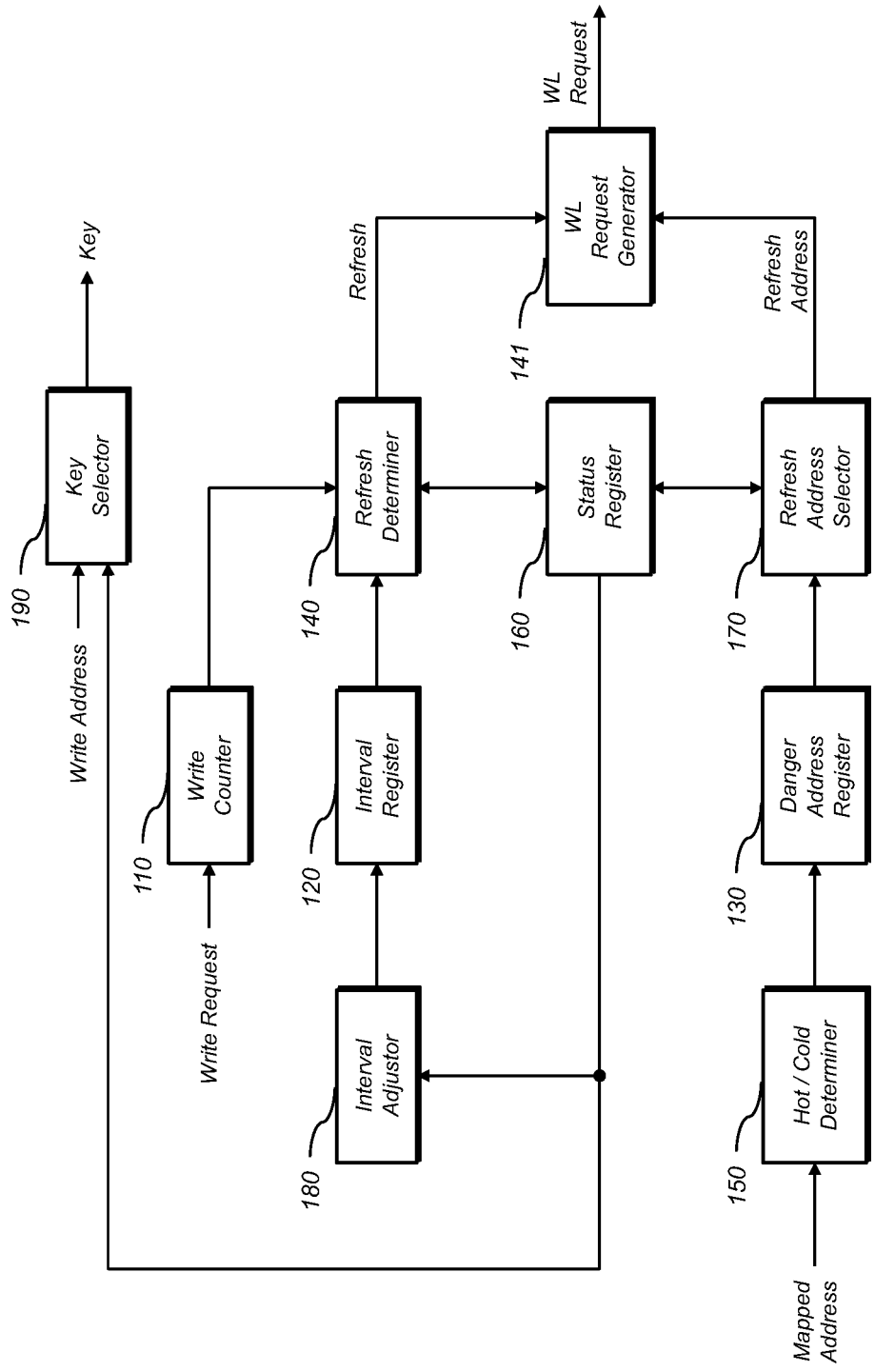
FIG. 2 is a block diagram representation of a wear leveling controller of FIG. 1.

FIG. 2 is a block diagram representation of an embodiment of the wear leveling controller 100.

The wear leveling controller 100 includes a write counter 110, an interval register 120, a status register 160, a refresh determiner 140, a hot/cold determiner 150, a danger address register 130, a refresh address selector 170, an interval adjuster 180, a key selector 190, and a wear leveling request generator 141.

The write counter 110 counts the number of write requests received following the performance of a refresh operation. When a refresh operation is performed, the count value of the write counter 110 is reset to zero.

The refresh determiner 140 compares the count value stored in the write counter 110 to a threshold value stored in the interval register 120, and generates an activated refresh signal when the count value of the write counter 110 is greater than or equal to the threshold value.

The wear leveling request generator 141 receives a refresh address from the refresh address selector 170 and generates a refresh request for the received refresh address in response to a refresh signal received from the refresh determiner 140.

The hot/cold determiner 150 receives a mapped address from the address mapper 200. The mapped address corresponds to a physical address. The hot/cold determiner 150 determines whether the mapped address has a hot attribute or cold attribute. A hot attribute indicates that the number of write requests for the mapped address is relatively high, and a cold attribute indicates that the number of write requests for the mapped address is relatively low.

In order to distinguish between the hot attribute and the cold attribute, various standards may be applied.

In an embodiment, a bloom filter is used to determine a hot/cold attribute. The bloom filter uses two hash functions to relate two counter values with one mapped address. When a write request is received, the counter values may be updated by increasing two counter values associated with a mapped address corresponding to a write address.

In an embodiment, when both of the counter values associated with the mapped address exceed a predetermined value, the bloom filter determines that the mapped address has a hot attribute. Otherwise, the bloom filter determines that the mapped address has a cold attribute.

Figure 3:
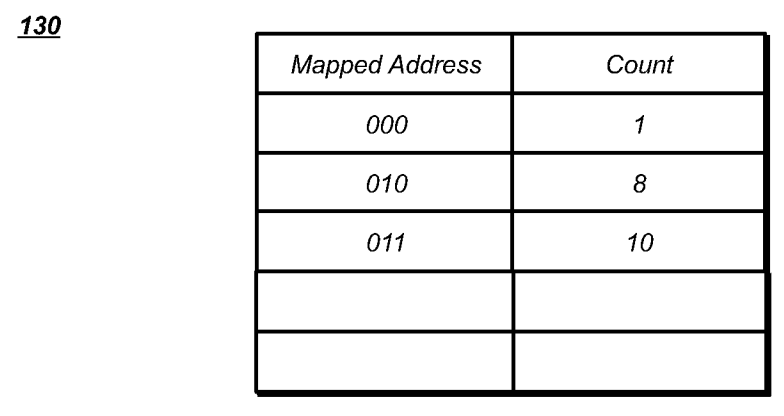

When a mapped address which is determined to be a hot address by the hot/cold determiner 150, that mapped address is stored in the danger address register 130. FIG. 3 illustrates an embodiment of the data structure of the danger address register 130. The danger address register 130 may store a mapped address having a hot attribute based on the count of requests for the mapped address.

The refresh address selector 170 selects an address to refresh from the danger address register 130. For example, the refresh address selector 170 selects the mapped address having the relatively highest request count from the danger address register 130.

The refresh address selector 170 refers to the status register 160, in order to determine whether the mapped address selected from the danger address register 130 is an address that has already been refreshed in the current round.

FIG. 4 illustrates the data structure of the status register 160. The status register 160 may store a logical address, a mapped address (or physical address) corresponding to the logical address, and a flag indicating whether the address has been refreshed.

In an embodiment, the mapped address may not be stored in the status register 160 due to limitations in the capacity of the status register 160. When no mapped address is stored, a mapped address corresponding to the logical address may be obtained by performing a logical operation on the logical address and a key value.

The status register 160 may store information on the number of times the mapped address selected from the danger address register 130 has already been refreshed (number of hits), and information on the number of times the selected mapped address has not been refreshed (number of misses).

The refresh address selector 170 determines whether the mapped address selected from the danger address register 130 is a refreshed address, and updates the number of hits or misses.

If it is determined that the mapped address selected from the danger address register 130 is a refreshed address, the interval adjuster 180 adjusts the interval to be a relatively greater. Otherwise, the interval adjuster 180 adjusts the interval to be relatively lower.

The interval adjuster 180 may determine the magnitude of the interval adjustment based on the numbers of misses and hits.

The interval adjuster 180 updates the value of the interval register 120 into the adjusted value of the interval. The interval at which the refresh operation is performed may be adjusted at each refresh operation.

If it is determined that the address selected from the danger address register 130 is a refreshed address, the refresh address selector 170 selects another address to be refreshed.

The next address selected for refreshing may be selected in a number of different ways. For example, the refresh address selector 170 may select an arbitrary address from among addresses that have not been refreshed, or may select an address included in the danger status register 130 from among the addresses that have not been refreshed.

Figure 5:
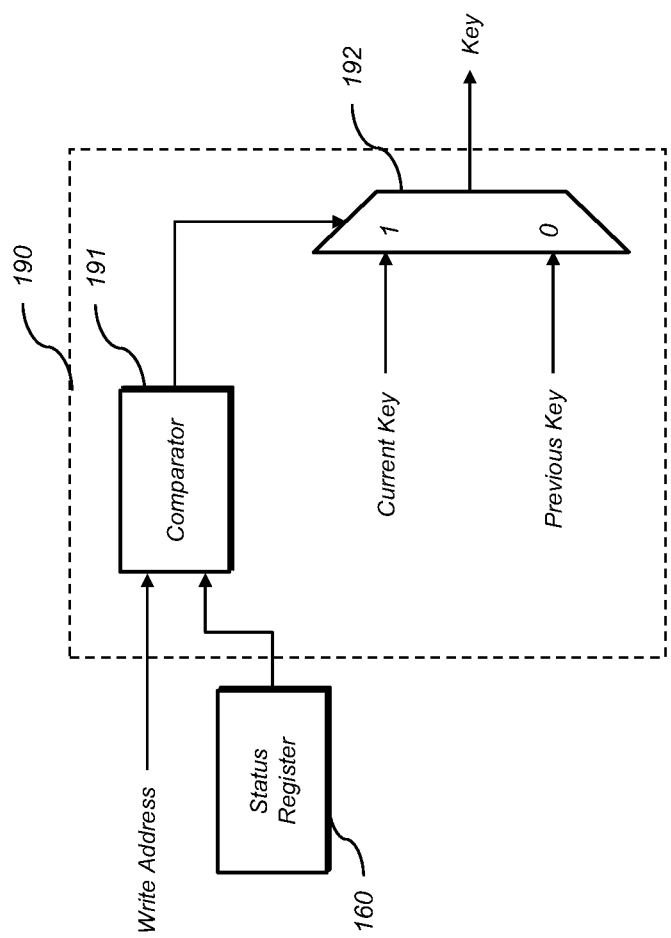
FIG. 5 is a block diagram representation of a key selector of FIG. 2.

The key selector 190 determines whether a write address is a refreshed address, and selects one of a previous key and a current key. FIG. 5 is a block diagram representation of the key selector 190.

A comparator 191 refers to the status register 160 to determine whether the write address has already been refreshed.

The current key is the key that is applied during the current round, and the previous key is the key that was applied during the previous round. When the write address is refreshed during the current round, the current key may be used to generate a mapped address. When the write address is not refreshed during the current round, the previous key may be used to generate a mapped address.

For this operation, the selector 192 outputs one of the current key and the previous key based on the comparison result generated by the comparator 191.

The configuration of the wear leveling controller 100 has been described with reference to FIG. 2, but is not limited thereto. For example, the wear leveling controller 100 may be implemented with a memory device where the operating method is stored in the form of program code, a processor core is used to execute the memory device, and a register is used to store data. The operation of the wear leveling controller 100 will be described with reference to a flowchart below.

Figure 6:
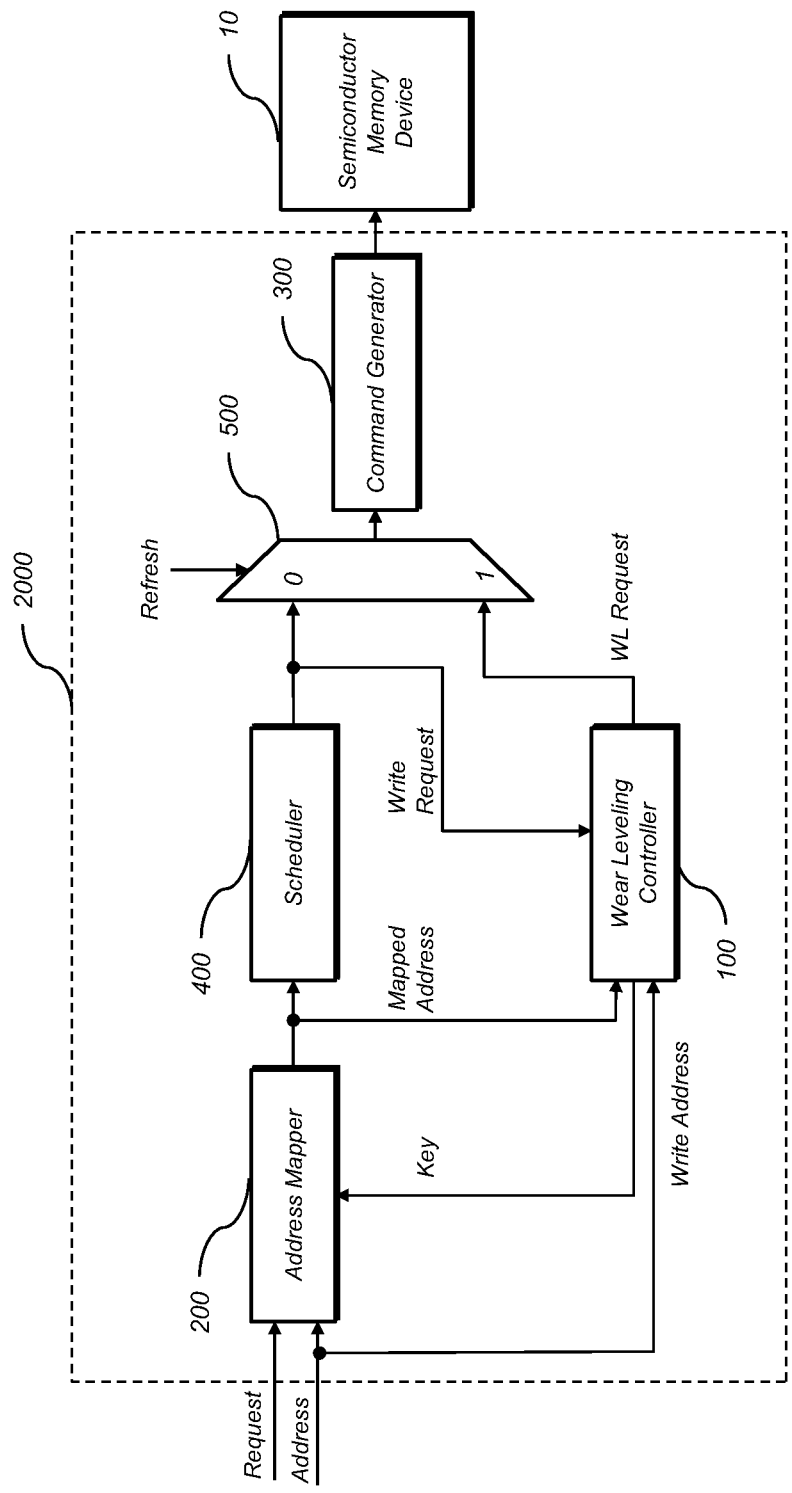
FIG. 6 is a block diagram representation of a system including an embodiment of a semiconductor device.

FIG. 6 is a block diagram representation of an embodiment of a semiconductor device 2000.

The semiconductor device 2000 includes a scheduler 400 and a control selector 500 in addition to the components shown in FIG. 1.

The scheduler 400 receives a plurality of read/write requests and addresses from a host, and determines the order in which the requests and addresses are to be processed.

The operations of the wear leveling controller 100 and the address mapper 200 are performed in substantially the same manner as the above-described embodiment.

The control selector 500 provides a refresh request received from the wear leveling controller 100 to the command generator 300.

When the refresh signal received from the wear leveling controller 100 is deactivated, the control selector 500 provides a mapped address received from the address mapper 200 and a read or write request selected by the scheduler 400 to the command generator 300.

The command generator 300 generates a command corresponding to the received request and address, and controls the operation of the semiconductor memory device 10.

FIGS. 7 to 10 are flowcharts representations of the operating method of an embodiment of the semiconductor device 2000.

Figure 7:
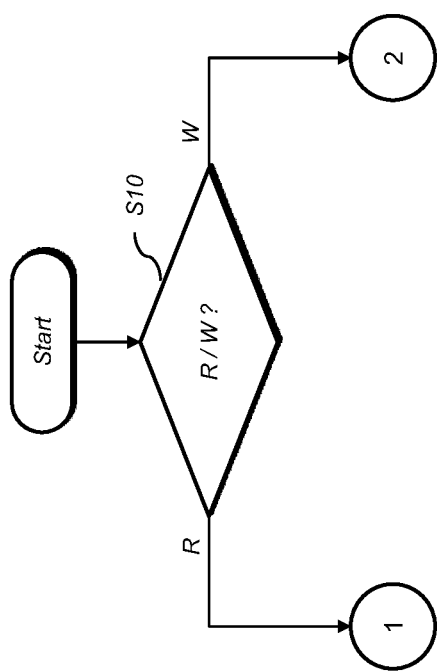
FIGS. 7 to 10 are flowcharts illustrating the operation of various embodiments of the semiconductor device.

At step S10 of FIG. 7, a determination is made regarding whether a request is a read request or a write request. If the request is a read request, the procedure proceeds to 1 of FIG. 8, and if the request is a write request, the procedure proceeds to 2 of FIG. 9. The determination of whether the request is a read request or a write request may be performed by the scheduler 400 of FIG. 6.

Figure 8:
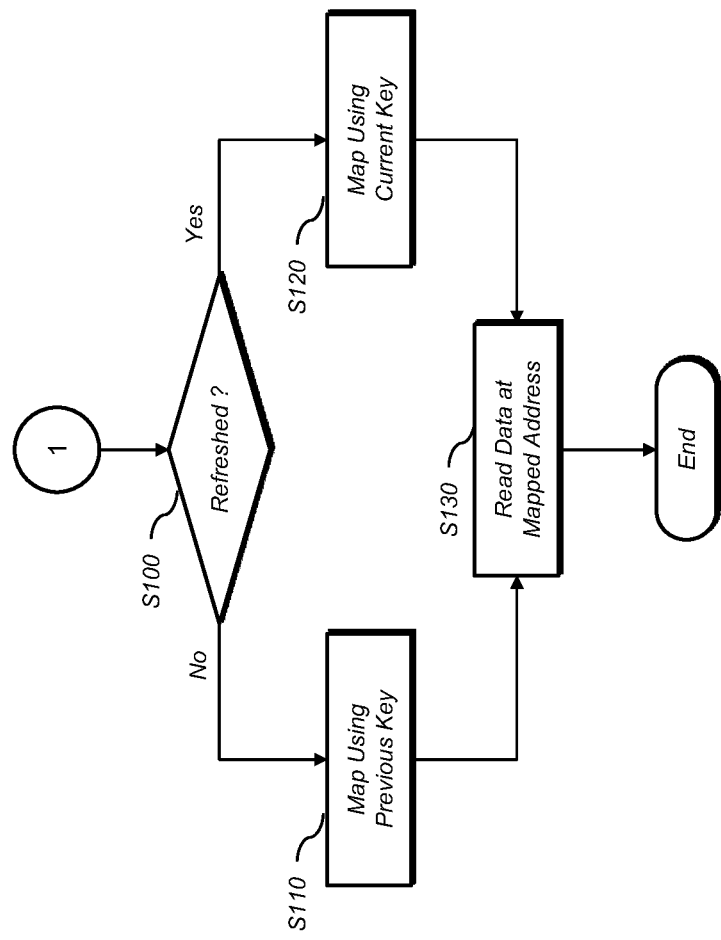

At step S100 of FIG. 8, a determination is made regarding whether a logical address corresponding to the read request (hereafter, referred to as a read address) has been refreshed. The determination of whether the read address has been refreshed may be performed by referring to the status register 130 of the wear leveling controller 100 in the manner described above.

If the read address has not been refreshed, a mapped address corresponding to the read address may be obtained by performing an operation on the read address using the previous key at step S110.

If the read address has been refreshed, a mapped address corresponding to the read address may be obtained by performing an operation on the read address using the current key at step S120.

After the mapped address has been obtained, data is read at the mapped address at step S130, and the read request process ends.

Figure 9:
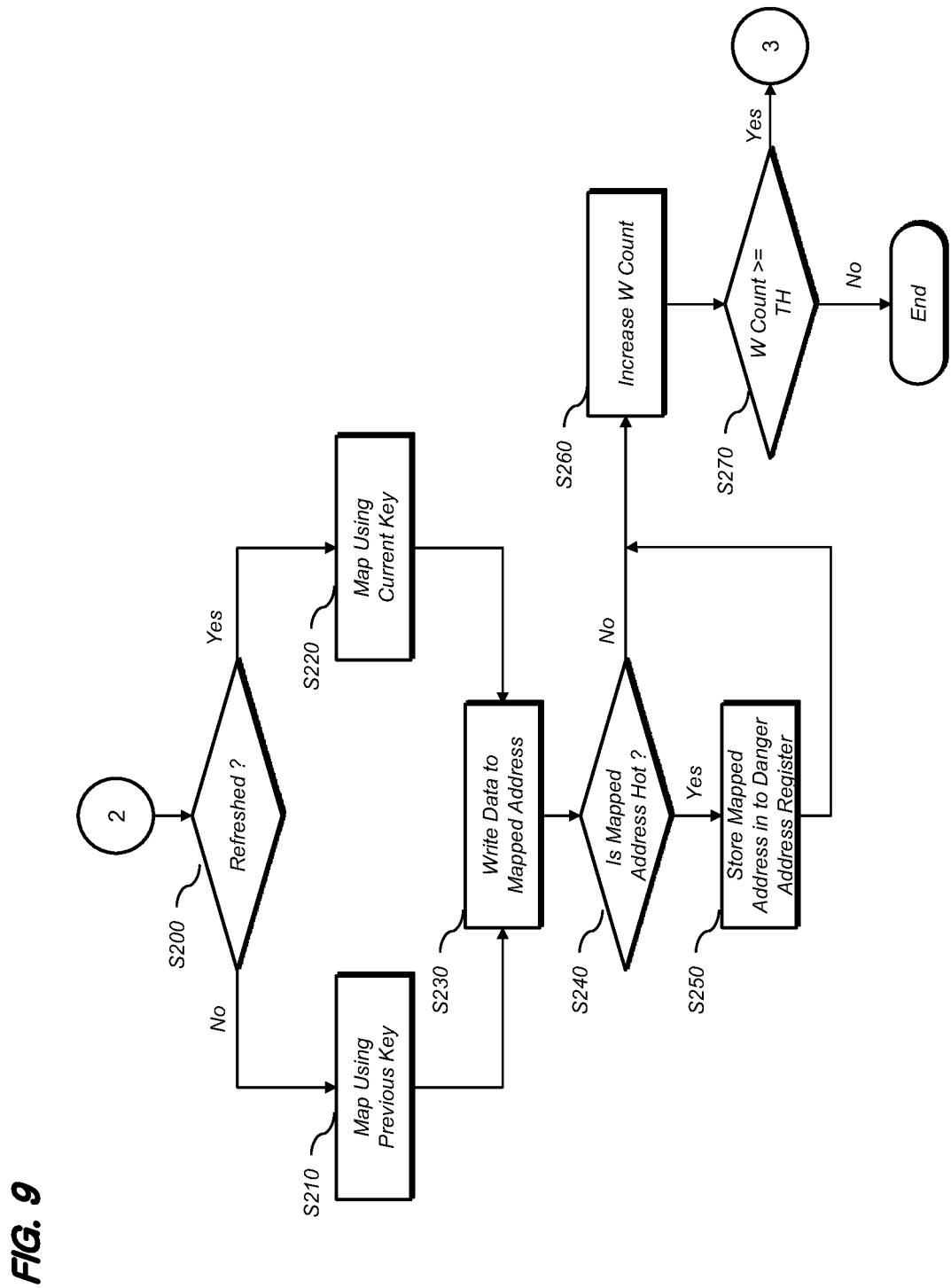

At step S200 of FIG. 9, a determination is made regarding whether a logical address corresponding to the write request (hereafter, referred to as a write address) has been refreshed. The determination of whether the write address has been refreshed may be performed by referring to the status register 130 of the wear leveling controller 100 in the manner described above.

If the write address has not been refreshed, a mapped address corresponding to the write address may be obtained by performing an operation on the write address using the key of the previous round, at step S210.

If the write address has been refreshed, the mapped address corresponding to the write address may be obtained by performing an operation on the write address using the key of the current round, at step S220.

After the mapped address has been obtained, data is written to the mapped address at step S230. The above-described operation is associated with general read and write operations.

The steps relating to wear leveling performed after the write operation will be described. The following steps may be performed by the wear leveling controller 100 and the wear leveler 200.

At step S240, a determination is made regarding whether the mapped address corresponding to the write address has a hot attribute. In an embodiment, a bloom filter is used to determine the attribute of the mapped address. The determination of the attribute of the mapped address using the bloom filter may be performed in the manner described above. However, alternative mechanisms for determining the attribute of the mapped address may be used.

If it is determined that the attribute of the mapped address is hot, the mapped address is stored in the danger address register 130 at step S250. If the mapped address already exists in the danger address register 130, the count value associated with the mapped address is increased.

The value of the write counter 110 is increased at step S260. The step of increasing the write counter value may be performed before step S250.

The value of the write counter 110 is compared to the threshold value stored in the interval register 120 at step S270.

If the value of the write counter 110 is relatively lower than the threshold value, the refresh operation is not performed, and the procedure ends.

Figure 10:
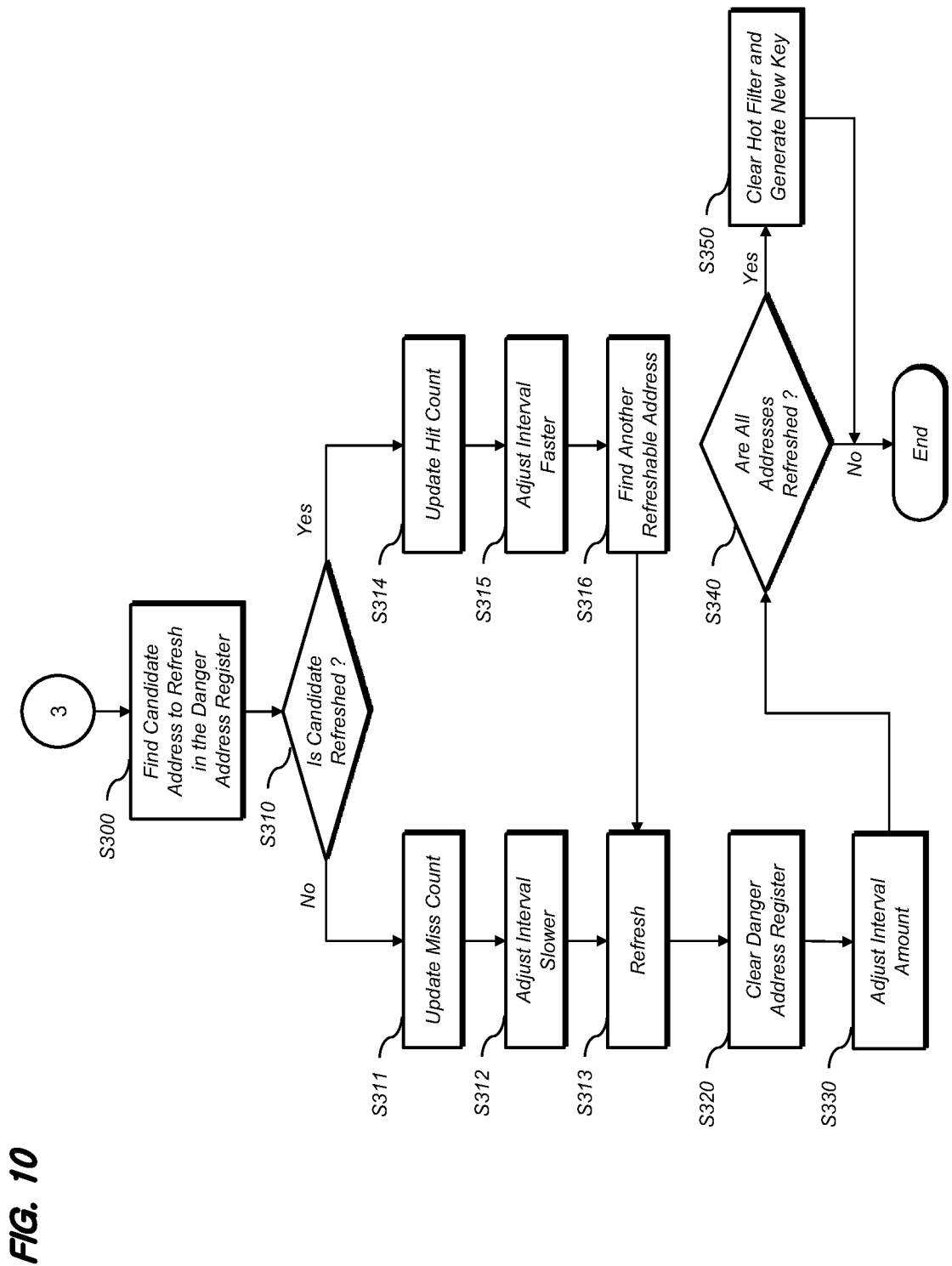

If the value of the write counter 110 is equal to or greater than the threshold value, the procedure proceeds to 3 of FIG. 10.

At step S300, the refresh address selector 170 selects an address to refresh from the danger address register 130. In an embodiment, the mapped address having the relatively highest count value in the danger address register 130 is selected as the address to refresh.

At step S310, a determination is made regarding whether the address selected from the danger address register 130 has already been refreshed. For this operation, the status register 160 may be referred to.

If the selected mapped address has not been refreshed, the miss count of the status register 160 is increased at step S311. The interval adjuster 180 increases the threshold value stored in the interval register such that the refresh interval becomes relatively slower, at step S312.

If the selected mapped address has been refreshed, the hit count of the status register 160 is increased at step S314. The interval adjuster 180 decreases the threshold value stored in the interval register such that the refresh interval becomes relatively faster, at step S315. Then, the refresh address selector 170 selects another mapped address to refresh. In an embodiment, an arbitrary address may be selected from among mapped addresses that have not been refreshed. In an embodiment, an address may be selected from among mapped addresses that have not been refreshed and stored in the danger address register 130. In an embodiment, a prime number may be added to the selected address so as to search and select an address from among the addresses that have not been refreshed. In an embodiment, a linear feedback shift register (LFSR) or the like may be used to select an address from among mapped addresses that have not been refreshed.

Upon the selection of the mapped address, a logical address corresponding to the mapped address may be obtained. The logical address may be mapped to a new physical address using the current key. In an embodiment, the wear leveling controller 100 performs a refresh operation using the existing mapped address and the new physical address.

In an embodiment, the wear leveling controller 100 performs a refresh operation by swapping the data of the existing mapped address for the data of the new physical address.

Then, the danger address register 130 may be reset at step S320. In an embodiment, the danger reset register 130 may not be reset until the round has been completed. In an embodiment, the count value of the danger address in the danger address register 130 may be decreased. In an embodiment, the danger address may be removed from the danger address register 130.

The interval adjuster 180 determines the amount of the interval to adjust, based on the miss count and the hit count, at step S330. In an embodiment, the interval amount may be determined on the basis of the following.

When the hit count is relatively greater than the miss count, the interval amount $I_f$ in the case where the interval is adjusted to be relatively faster may be set to 1, and the interval amount $I_s$ in the case where the interval is adjusted to be relatively slower may be set using Equation 1.

$$I_s = \max\left(1, \left\lceil \frac{hitcount}{miss\ count} \right\rceil\right) \quad \text{[Equation 1]}$$

In an embodiment, when the hit count is equal to or relatively lower than the miss count, the interval amount $I_s$ in the case where the interval is adjusted to be relatively slower may be set to 1, and the interval amount $I_f$ in the case where the interval is adjusted to be relatively faster may be set using Equation 2.

$$I_f = \max\left(1, \left\lceil \frac{miss\ count}{hitcount} \right\rceil\right) \quad \text{[Equation 2]}$$

After adjusting direction (i.e. relatively higher or relatively slower) the interval amounts are determined at step S330, S312, S315, the threshold value stored in the interval register 120 is updated.

The wear leveling controller 100 determines whether all of addresses have been refreshed at step S340.

If all addresses have not been refreshed, the process ends.

If all of the addresses have been refreshed, the current round ends. The counter values stored in the bloom filter that are used to determine hot/cold are reset.

In an embodiment, the counter values of the bloom filter may be reset at each refresh operation until the round is ended. The entire values may be periodically decreased, or a value selected as a danger address may be decreased.

A new key to use in the next round is generated. In an embodiment, a new key is generated by adding a prime number to the key of the current round. For example, when the key used at the current round is 010, a prime number of 111 may be added to 010 so as to generate a new key of 001.

In an embodiment, an LFSR or the like may be used to randomly generate a key.

The newly generated key is used as the current key in the next round, and the key used in the current round is used as the previous key in the next round to perform the mapping.

The semiconductor device may improve the performance of the wear leveling operation for a semiconductor memory device, and may increase the lifespan of the semiconductor memory device.

While certain embodiments have been described above, it will be understood to those skilled in the art that the embodiments described are by way of example only. Accordingly, the semiconductor device and operating method thereof described herein should not be limited based on the described embodiments. Rather, the semiconductor device and operating method thereof described herein should only be limited in light of the claims that follow when taken in conjunction with the above description and accompanying drawings.

What is claimed is:

1. A semiconductor device that remaps the relationship between logical addresses and physical addresses of a semiconductor memory device at each interval, comprising:
   a wear leveling controller configured to select a first physical address of a semiconductor memory device and to remap a logical address of the semiconductor memory device corresponding to the first physical address of the semiconductor memory device to a second physical address of the semiconductor memory device,
   wherein when a candidate physical address of a semiconductor memory device having a largest number of write requests has not been remapped, the wear leveling controller selects the candidate physical address as the first physical address, and
   wherein when the candidate physical address has been remapped, the wear leveling controller selects one of physical addresses which have not been remapped as the first physical address and adjusts the interval to be decreased.

2. The semiconductor device of claim 1, wherein the wear leveling controller comprises a first register configured to store a physical address determined to have a first attribute and the candidate physical address is selected in the first register.

3. The semiconductor device of claim 1, wherein the wear leveling controller adjusts the interval to be increased when the candidate physical address has not been remapped.

4. The semiconductor device of claim 3, wherein the wear leveling controller determines an amount to increase or to decrease the interval based on the number of cases where it is determined that the candidate physical address has been remapped and the number of cases where it is determined that the candidate physical address has not been remapped.

5. The semiconductor device of claim 1, wherein the wear leveling controller is configured to generate a request to swap data of the first physical address for data of the second physical address.

6. The semiconductor device of claim 1, further comprising an address mapper configured to convert one of a read address or a write address into a physical address by performing an operation on the one of the read address or the write address using a key.

7. The semiconductor device of claim 6, wherein the wear leveling controller selects one of a first or a second key based on a determination of whether the one of the read address or the write address has been remapped, and to provide the selected key as the key.

8. The semiconductor device of claim 7, wherein the second physical address is obtained by performing an operation on the logical address corresponding to the first physical address using the first key.

9. The semiconductor device of claim 7, wherein when an entire physical address region has been remapped, the wear leveling controller is configured to update the second key using the first key, and to update the first key using a newly generated key.

10. The semiconductor device of claim 6, further comprising:
a scheduler configured to select one of a plurality of read or write requests received from a host;
a control selector configured to select one of a request received from the wear leveling controller or a request received from the scheduler under the control of the wear leveling controller; and
a command generator configured to generate a command for the semiconductor memory device based on the selected request.

11. The semiconductor device of claim 10, wherein the control selector is configured to transmit an address received from the address mapper to the command generator when the request received from the scheduler is selected.

12. A semiconductor device that remaps the relationship between physical addresses and logical addresses of a semiconductor memory device at each interval, comprising:
a hot/cold determiner configured to define an attribute of at least one physical address of the semiconductor device corresponding to a write address as one of a hot attribute or a cold attribute;
a register configured to store the at least one physical address if the at least one physical address is determined to be hot; and
a wear leveling controller configured to select a hottest physical address among the at least one physical address stored in the register as a first physical address when the hottest physical address has not been remapped or to select a physical address which has not been remapped as the first physical address when the hottest physical address has been remapped, to remap a logical address corresponding to the first physical address to a second physical address, and to adjust the interval to be decreased when the hottest physical address has been remapped.

13. An operating method of a semiconductor device, comprising:
comparing a number of write requests to a threshold value corresponding to an interval, and determining whether to perform a remapping operation;
selecting a candidate physical address having a largest number of write requests as the first physical address when the candidate physical address has not been remapped or selecting one of physical addresses that have not been remapped as the first physical address when the candidate physical address has been remapped;
remapping a first logical address corresponding to the first physical address to a second physical address of the semiconductor memory device;
issuing a command to the semiconductor memory device to swap data of the first physical address for data of the second physical address; and
adjusting the interval to be decreased when the candidate physical address has been remapped.

14. The operating method of claim 13, further comprising:
adjusting the interval to be increased when the candidate physical address has not been remapped.

15. The operating method of claim 14, further comprising:
determining an amount to adjust the interval based on the number of cases that the candidate physical address has been remapped and the number of cases that the candidate physical address has not been remapped.

16. The operating method of claim 13, further comprising selecting one of a first or a second key based on whether the write address has been remapped, and generating a physical address by performing an operation using the selected key and the write address.

17. The operating method of claim 16, further comprising generating the second physical address by performing an operation on the first logical address using the first key.

18. The operating method of claim 17, further comprising:
determining whether the physical address region of the semiconductor memory device has been completely remapped;
generating a new key when the remapping is complete; and
updating the second key using the first key, and updating the first key using the new key.

19. The operating method of claim 18, wherein the new key is generated by performing an operation on the first key and a prime number.

* * * * *